United States Patent [19]

Ward

[11] 4,107,666
[45] Aug. 15, 1978

[54] VARIABLE PULSE DISTRIBUTION ELECTRO-OPTICAL SYSTEM

[75] Inventor: Ernest M. Ward, El Paso, Tex.

[73] Assignee: The United States of America as represented by the Secretary of the Army, Washington, D.C.

[21] Appl. No.: 759,225

[22] Filed: Jan. 10, 1977

[51] Int. Cl.² .................... G08B 5/00; H05B 37/00
[52] U.S. Cl. .................... 340/331; 244/3.16; 315/322; 328/153
[58] Field of Search ................... 340/83, 331, 332; 328/153; 244/3.16; 315/322

[56] References Cited

U.S. PATENT DOCUMENTS

| 3,631,392 | 12/1971 | Zelina | 340/331 |
| 3,668,436 | 6/1972 | Bacon | 340/83 |

*Primary Examiner*—S. C. Buczinski
*Attorney, Agent, or Firm*—Nathan Edelberg; Robert P. Gibson; Saul Elbaum

[57] ABSTRACT

A plurality of radiant energy sources are alternatively pulsed in accordance with programmable pulsing sequences to permit testing of guided homing seekers and the like. A trigger selector is provided for each source and takes the form of a programmable counter. A source selector receives externally supplied trigger pulses and applies them to one trigger selector until the pre-programmed count is reached, during which time the source associated with that trigger selector is actuated by each pulse. When the pre-programmed count is reached the source selector feeds the trigger pulses to a second trigger selector and to a second source associated with that trigger selector. When the separately programmed count on the second trigger selector is reached, the source selector transfers the trigger pulses back to the first source and trigger selector circuit. The cycle continues in this manner, alternatively supplying trains of trigger pulses to the radiant energy sources.

Conveniently, the head encompassing member is in the form of a head band which in itself constitutes said means for holding said temple members against the wearer's temples.

6 Claims, 3 Drawing Figures

VARIABLE PULSE DISTRIBUTION ELECTRO-OPTICAL SYSTEM

The invention described herein may be manufactured, used, and licensed by or for the United States Government for governmental purposes without the payment to me of any royalty thereon.

BACKGROUND OF THE INVENTION

The present invention relates to equipment for testing guided terminal homing seekers which require coded pulsed radiant energy for tracking. The preferred embodiment of the invention is described in terms of laser guided seekers in which two light sources or lasers are alternatively controlled; however, it is to be understood that other radiant energy sources for use with other radiant energy seekers may be controlled in accordance with the inventive concepts described herein.

In the testing of a laser guided seeker, it is desirable to observe the reaction of the seeker to two light sources having different locations. The light sources must be alternatively pulsed and the overall frequency from the combined light source transmissions must remain constant. However, the number of successive light pulses emitted from each location must be variable. By varying the duration of pulsed energy transmitted from each source, the seekers can be tested in a two source environment and the effect of different durations of pulsed energy can be studied for countermeasure purposes. It is also desirable to test the seeker for the effect of lost or skipped pulses and, further, to test the seeker for light intensity variations.

It is an object of the present invention to provide a test equipment capable of performing the tests described above. More particularly, it is an object of the present invention to provide an electronic circuit which permits controlled programming of pulse application to two light sources.

SUMMARY OF THE INVENTION

In accordance with the present invention a light source selector receives a train of trigger pulses at a specific frequency or at a pseudo random period required for the pulse coded seekers under test. As the pulses are received by the light source selector they are distributed to one of two light sources. These sources transmit a pulse of radiant energy each time a trigger is received. For each light source there is a corresponding trigger selector circuit which is programmable either manually or automatically to some selection number which represents the number of triggers that will be sent successively to the corresponding light source. As the triggers are sent to that source they are counted by the trigger selector circuit. When the count reaches the number selected at the trigger selector circuit, the triggers are steered to the second source and are likewise counted by the trigger selector circuit for that second source. When the count selected at the second trigger selector source is reached, the triggers are once again sent to the first source and the cycle repeats.

Light pulses transmitted under control of a circuit of this type have an overall frequency which is at the correct rate for tracking by the seeker under test. The seeker's performance may be monitored in a two source environment with selectable durations of bursts of radiant energy originating from two source locations. If one source is disconnected the test equipment may be utilized to study the effect of lost or missing pulses on the seeker. In additon if the pulsed sources are replaced with CW sources operating at different intensities, the effect of intensity variation of energy received at the seeker can be tested.

BRIEF DESCRIPTION OF THE DRAWINGS

The above and still further objects, features and advantages of the present invention will become aparent upon consideration of the following detailed description of one specific embodiment thereof, especially when taken in conjunction with the accompanying drawings, wherein.

DESCRIPTION OF THE PREFERRED EMBODIMENTS

Figure 1:
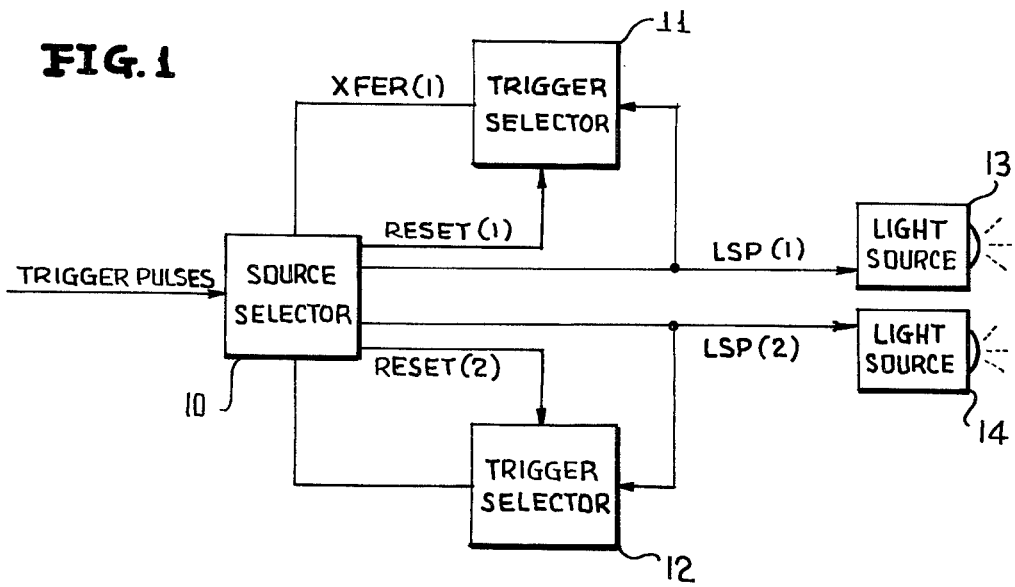
FIG. 1 is a functional block diagram of a preferred embodiment of the present invention.

Referring specifically to FIG. 1 of the accompanying drawings, a series or train of trigger pulses are received at a source selector unit 10. The source selector is controlled by trigger selector 11 and trigger selector 12 to alternatively steer the trigger pulses to activate light source 13 or light source 14. Specifically, each of trigger selectors 11 and 12 are preset to respective numbers under the control of an operator or automatic control equipment (not shown). Initially the trigger pulses are passed by source selector 10 as light source pulses LSP(1) to light source 13 and to trigger selector 11. The LSP(1) pulses are counted at trigger selector 11 until such time as the preset number in that trigger selector is reached. A transfer or XFER(1) signal is generated when the preset number is reached and applied to the source selector where it serves to inhibit the LSP(1) signal and provide the LSP(2) signal. In addition the XFER(1) signal received at the source selector 10 generates a RESET(1) signal which is applied at the trigger selector 11 where the count is reset to zero. The LSP(2) signals are applied both to trigger selector 12 and light source 14 until such time as the preset number for trigger selector 12 is reached. At that time the XFER(2) signal is applied to source selector 10 to inhibit the LSP(2) signal and once again cause the LSP(1) pulses to be generated. The RESET(2) signal is also generated at this time to reset the count in trigger selector 12 to zero.

In the manner described above the LSP(1) and LSP(2) pulse trains trigger light sources 13 and 14 during alternative durations. The duration of each LSP pulse train may be different so that light source 13 receives a different number of successive pulses than light source 14. The trigger pulses applied to source selector 10 may be at a specific frequency or may have a pseudo random period required for the particular pulse coded seekers being tested. The light sources 13 and 14 may be spatially separated to test the effect on a seeker of pulsed energy emanating from different locations. The light sources may be conventional pulsed lasers or, as described subsequently, may be CW light sources.

Figure 2:
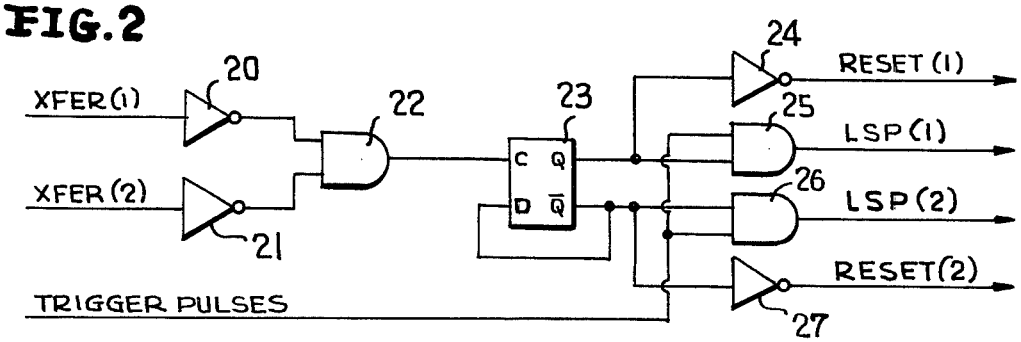
FIG. 2 is a logic diagram of the source selector unit illustrated in FIG. 1.

A logic diagram for source selector 10 is illustrated in FIG. 2. Specifically, the source selector includes logic inverters 20 and 21 which receive the XFER(1) and XFER(2) signals, respectively. The output signals from inverters 20 and 21 are applied to a two-input AND gate 22, the output of which is applied to the clock input of a bistable flip flop 23. The data input for flip flop 23 is received from the $\overline{Q}$ output terminal of the flip flop. The Q output signal from flip flop 23 is applied to logic inverter 24 and to one input of a two-input AND gate 25. The $\overline{Q}$ input of flip flop 23 is applied to logic inverter 27 and to one input of a two-input AND gate 26. The trigger pulses received by the source selector are applied to the second inputs of each of AND gates 25 and 26. The RESET(1) and RESET(2) signals are provided by inverters 24 and 27, respectively. The LSP(1) and LSP(2) signals are provided by AND gates 25 and 26, respectively.

In operation, assume that flip flop 23 is set so that the Q output signal is binary 1 and the $\overline{Q}$ output signal is binary 0. For as long as this condition persists, AND gate 25 provides an LSP(1) pulse in correspondence to each of the input trigger pulses. In addition, the binary 0 $\overline{Q}$ output signal is inverted by inverter 27 to provide a RESET(2) signal which maintains trigger selector 12 in a reset count condition. The LSP(1) pulses are counted by trigger selector 11 until such time as the preset count for that selector is reached and the XFER(1) pulse is generated. This pulse is inverted to a binary 0 state to inhibit AND gate 22 so that upon the trailing edge of the XFER(1) pulse AND gate 22 is activated to clock flip flop 23 at that time. Since the Q signal is binary 0 under the assume conditions, the flip flop is reset and provides a binary 1 $\overline{Q}$ output signal and a binary 0 Q output signal. With flip flop 23 thusly reset, the binary 0 Q output signal is inverted by inverter 24 to provide a RESET(1) signal to reset trigger selector 11. In addition the binary 0 Q output signal inhibits AND gate 25 so that the LSP(1) pulses are no longer provided. The binary 1 $\overline{Q}$ signal enables AND gate 26 so that the LSP(2) signals can be provided to trigger selector 12 and light source 14. When the present count in trigger selector 12 is reached the XFER(2) pulse trailing edge clocks flip flop 23 so that the flip flop is once again set and the cycle repeats. Trailing edge clocking at flip flop 23 assures that the triggers are not steered from one source to the other until after the entire period of the last trigger pulse has been applied to its respective light source. If trailing edge clocking were not employed, a light source might miss a trigger pulse or both sources could be triggered by the same impulse.

Figure 3:
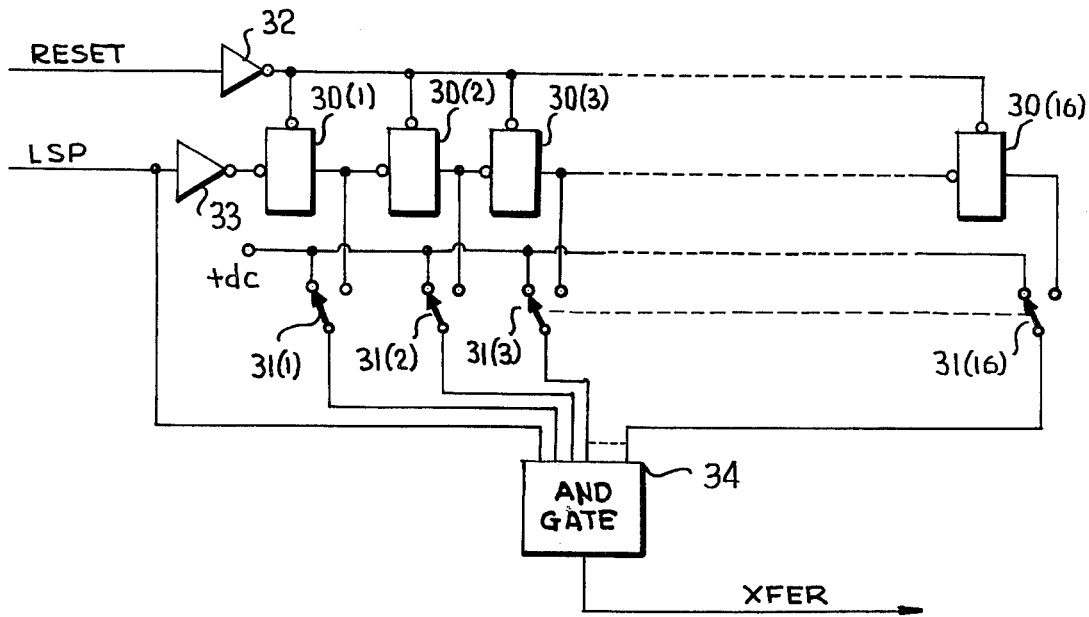
FIG. 3 is a logic diagram of the trigger selector unit illustrated in FIG. 1.

FIG. 3 is a logic diagram representing each of trigger selectors 11 and 12. The trigger selector is basically a 16 stage counter comprising individual binary stages 30(1), 30(2), . . . 30(16). It is to be understood, however, that the number of stages is strictly a matter of choice, 16 stages being chosen as a convenient number for purposes of this description. The stages are arranged to count LSP pulses applied to the counter via inverter 33. The stages are all reset together by the RESET signal applied to each stage through inverter 32. There are 16 single pole double throw switches 31(1), 31(2) . . . . 31(16), each associated with a respective counter stage 30(1), 30(2) . . . . 30(16). Specifically, using stage 1 as a typical representation, the output signal from stage 30(1) is connected to the normally open contact of switch 31(1). The normally closed contact of switch 31(1) receives a + DC signal representing the logic or binary 1 level. The arm of switch 31(1) is connected to a multi-input AND gate 34 as are the arms of all of switches 31. In addition the LSP pulse is applied to AND gate 34. The output signal from AND gate 34 is the XFER signal applied to the source selector.

In operation, when a binary 1 RESET signal from the source selector is received, all of the binary stages of the counter are reset simultaneously. When the RESET signal is binary 0, LSP pulses received from the source selector are counted in the 16 bit binary counter. The switches 31 represent a binary number of 16 bits which permit a count from 0 to 65,535 to be selected. The count is selected by throwing the appropriate switches 31 to their normally open positions. When the trigger count in the counter matches the count selected by the switches, AND gate 34 is enabled to provide the XFER signal. As described in respect to FIGS. 1 and 2, the XFER signal acts to control source selector 10 to steer the LSP signals to the other trigger selector and light source. Also as described above, provision of the binary 1 XFER signal results in a RESET signal being received back at the trigger selector to reset the count at that unit. It should be noted that both trigger selector units are identical to the circuit illustrated in FIG. 3.

It should be noted that the light sources 13 and 14 can be any commercial or labroatory-developed pulse sources that require trigger pulses for actuation. A modification to the preferred embodiment permits its use as a more versatile testing device. For example, by tying continuous light sources directly to the outputs of flip flop 23, the system can be used as an optical contrast generator in which the switch settings at the trigger selectors would determine how long each light source is rendered active for radiation. This permits testing of optical contrast systems in an environment of varying light intensities at different locations.

It should also be noted that the manual switches 31 can be replaced by computer interface logic or other automatic control switching whereby programming need not be done manually at the trigger selector itself but can be done in some remote location. In such a configuration many more test situations can be developed and analyzed.

It should also be noted that one of the light sources may be disconnected whereby the effect of lost or missing pulses on the tested seeker can be tested. This is accomplished by selecting a large enough number of pulses to insure tracking for the remaining source; the number selected for the disconnected source will define the number of missing pulses. Therefore, the effect of an exact number of missing pulses on a pulse coded seeker can be observed.

I wish it to be understood that I do not desire to be limited to the exact details of construction shown and described, for obvious modifications can be made by a person skilled in the art.

I claim:

1. A variable pulse distribution system for testing radiant energy seekers comprising:
    means for providing repetitive trigger pulses;
    a first radiant energy source for radiating energy when in receipt of a first activation signal;
    a second radiant energy source for radiating energy when in receipt of a second activation signal;
    controllable source selector means for alternatively supplying said trigger pulses to said first and second radiant energy sources;
    first trigger selector means including: a first pulse counter for counting trigger pulses supplied to said first radiant energy source; and first pre-set means for providing a first control pulse to said source selector means when said first counter attains a first pre-selected count; and second trigger selector means including: a second pulse counter for counting trigger pulses applied to said second radiant energy source; and second pre-set means for providing a second control pulse to said source selector means when said second counter attains a second pre-selected count;

wherein said first and second pre-selected counts are independently adjustable; and wherein said source selector means comprises means responsive to said first control pulse for supplying subsequent trigger pulses to said second radiant energy source and responsive to said second control pulse for supplying subsequent trigger pulses to said first radiant energy source.

2. The system according to claim 1 wherein said first and second radiant energy sources are light sources which are spaced from one another.

3. The system according to claim 2 wherein each light source provides a burst of light energy in response to each trigger pulse supplied thereto.

4. The system according to claim 2 wherein said light sources provide continuous wave light energy during the interval when sequential trigger pulses are applied thereto.

5. The system according to claim 4 wherein said light sources provide said light energy at different intensities.

6. The system according to claim 1 wherein said source selector means includes:

a flip flop arranged to switch between first and second stable states in response to receipt of said first and second control pulses, respectively, at said source selector means;

first gating means for supplying said trigger pulses to said first radiant energy source when said flip flop is in said first stable state; and second gating means for supplying said trigger pulses to said second radiant energy source when said flip flop is in said second stable state.

* * * * *